— Patented Sept. 20, 1971

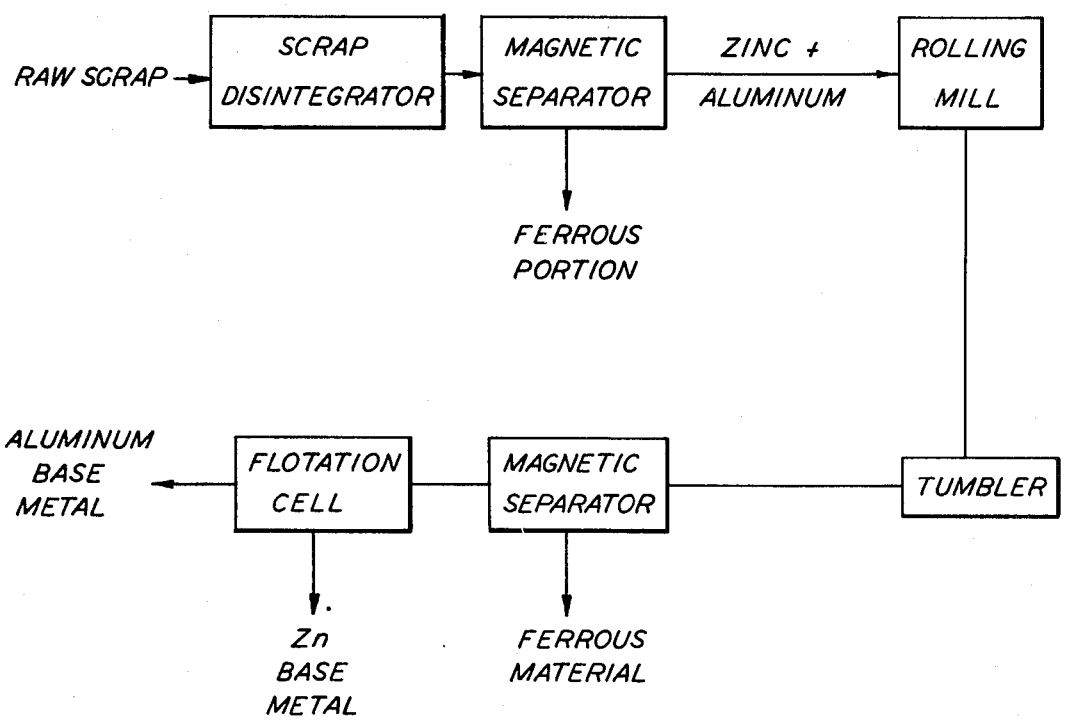

3,605,243
SCRAP RECOVERY PROCESS
Thomas H. Oster, Dearborn, Mich., assignor to
Ford Motor Company, Dearborn, Mich.
Filed Mar. 18, 1969, Ser. No. 808,204
Int. Cl. B23q 17/00
U.S. Cl. 29—403                                              4 Claims

ABSTRACT OF THE DISCLOSURE

This disclosure is directed to a process for the separation of zinc and aluminum base scrap from the usual impurities accompanying such scrap. Such impurities are usually ferrous metal and copper base metals such as brass and bronze. Aluminum and zinc scrap is preferably first ground and so reduced in size and then flattened by passage through sturdy rolls to reduce it in thickness and simultaneously expedite its separation from ferrous and copper base impurities.

---

The scrap industry is confronted with the necessity of handling on a profitable basis large tonnages of nonferrous scrap in which the dominant metal value lies either in its aluminum content or its zinc content, or a mixture of these metals. The zinc and aluminum are invariably contaminated with iron or copper base metals.

Many machines are known which are capable of disintegrating the various articles of zinc or aluminum scrap as received. This scrap is typically discarded vacuum cleaners, garbage grinders, internal combustion engine pistons, fuel pumps, carburetors, and miscellaneous aluminum and zinc products found on motor vehicles. This type of scrap is readily disintegrated by a variety of machines such as jaw crushers, hammer mills, ball mills, rod mills and more recently by a machine described in United States Letters Patent 3,429,532 issued Feb. 25, 1969 and pending applications Ser. Nos. 787,448 and 787,646, both filed Dec. 30, 1968, Pat. No. 3,561,072.

Fundamentally, this invention is dependent upon the step of reducing the effluent from a primary disintegrator to a flow of material having in each piece at least one dimension not substantially exceeding about three-sixteenths or one-quarter inch. The preferred manner of accomplishing this is to pass the material through a sturdy rolling mill and in either one or a series of passes reducing the material to this maximum dimension.

The sole figure of drawing has been presented to enable a more facile understanding of this invention. This figure of drawing is a schematic drawing of the process for freeing disintegrated aluminum and zinc scrap from ferrous and copper base materials.

This figure of drawing shows the raw scrap entering a disintegrator of the type described in United States Letters Patent 3,429,022 and passing from this disintegrator to a magnetic separator where a gross separation is made between the zinc, copper base metals and aluminum on one hand and the ferrous materials on the other hand. It is preferred to adjust the disintegrator so that each piece ejected from the disintegrator has a maximum dimension which will easily be seized by the nip of the rolls to follow.

The zinc and/or aluminum scrap leaving the magnetic separator is fed into a conventional metal working rolling mill and there reduced until its maximum dimension in at least one direction is not substantially over three-sixteenths of an inch. This particular value has been chosen because of the characteristics of the particular type of scrap employed in the development of this process.

The critical criterion to be used in establishing a maximum dimension for any particular type of scrap is that which will crush the zinc and/or aluminum associated with iron or copper base alloys to an extent that upon further treatment the zinc and/or aluminum will break away from the iron or copper base contaminants. The iron or copper base contaminants are sufficiently harder and stronger than the aluminum and/or zinc that when the thickness of the scrap fragments approach the thickness of the contaminating iron or copper base material, the local thickness of the aluminum or zinc scrap fragments adjacent the contaminating metal will be reduced to an extent that the zinc or aluminum will break readily immediately over the iron or copper base metal contaminant.

The exact rolling procedure to be used to reduce the scrap fragments to the desired minimum thickness is not critical. The desired degree of reduction can be accomplished in a single pass, or a plurality of passes, depending upon the particular rolling facilities available.

The scrap fragments suitably reduced in size are next tumbled or otherwise mildly comminuted to cause the ferrous and copper base metals to break away from the zinc and/or aluminum. A similar result may be obtained by rolling the reduced aluminum or zinc through corrugating rolls to break the iron or copper base alloys away from the zinc or aluminum and so effect a physical detachment of the contaminants.

The scrap fragments with the contaminants broken away from the zinc and aluminum are passed through a magnetic separator to accomplish an almost quantitative separation of all ferrous metals from the zinc, aluminum, and copper base metals. The effluent from the magnetic separator may, if necessary, be passed through a flotation cell in which an aqueous suspension of ferro-silicon or mill scale is employed as a heavy media separant to float the aluminum from the zinc and copper base material.

The copper base material may be removed by handpicking because of its high value, or it may be extracted by the ammonia carbonate process taking advantage of the fact that the copper is usually more finely divided than the zinc and responds more readily to this type of lixiviation.

As a specific example, zinc scrap from automotive carburetors and aluminum scrap from vacuum cleaners was first passed through a commercial disintegrator of the type described in the patent literature cited herein. The fragments had a maximum dimension in one direction of about three-quarters of an inch. This material was then rolled in several passes through a rolling mill to a thickness of three-sixteenths of an inch. The rolls were steel and eight inches in diameter. The material so rolled was disintegratable manually. The manually disintegrated material was then separated as to iron magnetically and from copper by handpicking. The residue when melted gave an almost quantitative yield of metal pig.

This invention has been described as a step subsequent to the preliminary disintegration of the original scrap in any of the many known metal disintegrators. However, if the nature of the scrap is suitable, as for instance, automotive fuel pumps or carburetors, the original disintegration may be dispensed with and all of the reduction accomplished in a sufficiently large and rugged rolling mill, using the required number of passes to reduce the scrap material to a sheet of the desired maximum dimension.

I claim as my invention:
1. A process for removing iron and copper base contaminants from zinc or aluminum base scrap comprising reducing the zinc or aluminum base scrap to fragments exhibiting at least one maximum dimension capable of reception in a rolling mill, rolling the zinc or aluminum fragments so that they exhibit a maximum thickness not substantially greater than the dimension of the contaminating iron or copper metals and mechanically separating the product so obtained to secure scrap aluminum or zinc fragments substantially free of iron or copper base contaminants.

2. The process recited in claim 1 in which the rolled zinc or aluminum metal is subjected to a tumbling operation to mechanically detach the zinc or aluminum metal from the iron and copper base metals.

3. The process recited in claim 1 in which the rolled zinc or aluminum metal is passed through corrugated rolls to mechanically detach the zinc or aluminum from the iron and copper base metals.

4. A process for removing iron and copper base contaminants from zinc or aluminum base scrap comprising reducing the zinc or aluminum base scrap by rolling until said scrap exhibits at least one maximum dimension which maximum dimension is not substantially greater than the corresponding dimension of the contaminating iron or copper base contaminants and mechanically separating the product so obtained to secure scrap aluminum or zinc substantially free of iron or copper base contaminants.

References Cited
UNITED STATES PATENTS

| | | | |
|---|---|---|---|
| 2,551,893 | 5/1951 | Morton | 241—20 |
| 2,824,052 | 2/1958 | Czech | 241—20 |
| 2,942,792 | 6/1960 | Anderson | 241—20 |
| 2,977,255 | 3/1961 | Lowry | 29—403 |
| 3,225,428 | 12/1965 | Deitz | 29—403 |
| 3,300,147 | 1/1967 | Johnston | 241—20 |
| 3,429,022 | 2/1969 | Oster | 29—403 |
| 3,502,271 | 3/1970 | Hays | 241—20 |

JOHN F. CAMPBELL, Primary Examiner

D. P. ROONEY, Assistant Examiner

U.S. Cl. X.R.

75—43; 209—38; 241—20, 29, Dig. #22